United States Patent
Lowles et al.

(10) Patent No.: US 7,388,571 B2
(45) Date of Patent: Jun. 17, 2008

(54) SYSTEM AND METHOD OF INTEGRATING A TOUCHSCREEN WITHIN AN LCD

(75) Inventors: Robert J. Lowles, Waterloo (CA); James A. Robinson, Elmira (CA); Ken Wu, Burlington (CA)

(73) Assignee: Research In Motion Limited, Waterloo (CA)

( * ) Notice: Subject to any disclaimer, the term of this patent is extended or adjusted under 35 U.S.C. 154(b) by 473 days.

(21) Appl. No.: 10/717,877

(22) Filed: Nov. 20, 2003

(65) Prior Publication Data

US 2004/0155991 A1    Aug. 12, 2004

Related U.S. Application Data

(60) Provisional application No. 60/427,963, filed on Nov. 21, 2002.

(51) Int. Cl.
G09G 3/36    (2006.01)
G09G 5/00    (2006.01)

(52) U.S. Cl. .................... 345/104; 345/173; 345/179
(58) Field of Classification Search ................ 345/87, 345/104, 156, 173–181, 179, 182–184, 103
See application file for complete search history.

(56) References Cited

U.S. PATENT DOCUMENTS

| | | | |
|---|---|---|---|
| 4,005,403 A | | 1/1977 | Washizuka et al. |
| 4,224,615 A | * | 9/1980 | Penz ........................... 345/174 |
| 4,363,029 A | | 12/1982 | Piliavin et al. |
| 4,529,968 A | | 7/1985 | Hilsum et al. |
| 4,814,760 A | * | 3/1989 | Johnston et al. ............. 345/104 |
| 5,159,323 A | | 10/1992 | Mase et al. |

(Continued)

FOREIGN PATENT DOCUMENTS

EP    61063492    3/1986

(Continued)

OTHER PUBLICATIONS

Written Opinion, PCT/CA03/01822, Jul. 27, 2004.

(Continued)

*Primary Examiner*—Duc Q Dinh
*Assistant Examiner*—Duc Dinh
(74) *Attorney, Agent, or Firm*—Ridout & Maybee

(57) ABSTRACT

A touchscreen liquid crystal display that includes a liquid crystal display including a viewing surface, a liquid crystal area containing liquid crystal located behind the viewing surface, a plurality of spaced apart elongate first electrodes located on a viewing surface side of the liquid crystal area and a plurality of spaced apart elongate second electrodes located on an opposite side of the liquid crystal area, the first and second electrodes overlapping to form an array of liquid crystal pixel elements, at least some of the first electrodes being displaceable towards the second electrodes in response to external pressure applied to the viewing surface. A control circuit is connected to the first and second electrodes for controlling the operation of the liquid crystal display. The control circuit includes (i) a driver circuit for driving the electrodes for selectively controlling a display state of the pixel elements; and (ii) a measurement circuit for detecting displacement of the at least some of the first electrodes in response to external pressure applied to the viewing surface.

19 Claims, 5 Drawing Sheets

U.S. PATENT DOCUMENTS

| | | | |
|---|---|---|---|
| 5,305,017 A | | 4/1994 | Gerpheide |
| 5,543,588 A | * | 8/1996 | Bisset et al. ............. 178/18.06 |
| 5,825,352 A | | 10/1998 | Kasser |
| 5,920,309 A | * | 7/1999 | Bisset et al. ................ 345/173 |
| 6,222,528 B1 | | 4/2001 | Gerpheide et al. |
| 6,239,788 B1 | * | 5/2001 | Nohno et al. ............... 345/173 |
| 6,414,671 B1 | | 7/2002 | Gillespie et al. |

FOREIGN PATENT DOCUMENTS

| | | |
|---|---|---|
| EP | 63331192 | 12/1988 |
| EP | 0609021 A2 | 8/1994 |
| EP | 0773497 A1 | 5/1997 |
| GB | 2033632 A | 5/1980 |
| JP | 62218941 A | 9/1987 |
| JP | 02178618 A | 7/1990 |

OTHER PUBLICATIONS

International Search Report for corresponding PCT/CA03/01822, dated Mar. 20, 2004.
European Search Report for EP Patent Application No. 03776718.3.
International Search Report for corresponding PCT/CA03/01822, dated Mar. 20, 2004.
Patent Abstracts of Japan-vol. 012, No. 086 (P-677), Mar. 18, 1988 & JP 62218941 A (Mitsubishi Electric Corp) Sep. 26, 1987.
Patent Abstracts of Japan-vol. 014, No. 449 (P-1111), Sep. 26, 1990 & JP 02178618 A (Seikosha Co Ltd) Jul. 11, 1990.

* cited by examiner

SYSTEM AND METHOD OF INTEGRATING A TOUCHSCREEN WITHIN AN LCD

This application claims priority to Provisional U.S. Patent Application No. 60/427,963 filed Nov. 21, 2002.

BACKGROUND OF THE INVENTION

1. Field of the Invention

This invention relates to the field of liquid crystal displays (LCDs). More specifically, this invention relates to touchscreen LCDs.

2. Description of the State of the Art

Although there are several types of touchscreens possible, the two most commonly used touchscreens in handheld electronic devices are resistive and capacitive touchscreens.

Resistive touchscreens use a thin, flexible membrane over a glass substrate. The substrate surface and the facing membrane surface have a transparent metallic coating and are separated by spacers. When a user presses on the outer surface of the membrane, the inner surface of the membrane meets the substrate causing a change in resistance at the point of contact. A touchscreen controller measures this resistance using the membrane and the substrate as a probe. The two resistance measurements provide the x and y coordinates of the point of contact. Resistive touchscreens reduce the reflection and clarity of the LCD because of the added membrane layer and air gap in front of the surface of the LCD. A solution is required that does not require added layers that reduces the LCD visibility.

Capacitive touchscreens use a metallic coating on a glass sensor. Typically, voltage is applied to the four corners of the sensor. When the screen is not in use, the voltage spreads across the sensor in a uniform field. When the user touches the sensor, the touchscreen controller recognizes a disturbance of the field and sends the x-y coordinate of the point of contact to the CPU of the device. Capacitive touchscreens can only be used with a bare finger or conductive stylus. A touchscreen solution is required that can convert any touch into touchscreen data.

Resistive and capacitive touchscreens add thickness to the LCD module because of the added layers to provide touchscreen capabilities. With the demand for streamlining and minimizing the size of handheld devices, LCD modules need to be as thin as possible. A touchscreen solution is required to maximize the reflective characteristics of an LCD and to minimize the thickness of an LCD module.

SUMMARY

In one aspect, a touchscreen is integrated into an LCD by using the electrodes that forms the pixels to measure voltage differences to locate a point of contact.

According to at least one example aspect, a touchscreen liquid crystal display that includes a liquid crystal display including a viewing surface, a liquid crystal area containing liquid crystal located behind the viewing surface, a plurality of spaced apart elongate first electrodes located on a viewing surface side of the liquid crystal area and a plurality of spaced apart elongate second electrodes located on an opposite side of the liquid crystal area, the first and second electrodes overlapping to form an array of liquid crystal pixel elements, at least some of the first electrodes being displaceable towards the second electrodes in response to external pressure applied to the viewing surface. A control circuit is connected to the first and second electrodes for controlling the operation of the liquid crystal display. The control circuit includes (i) a driver circuit for driving the electrodes for selectively controlling a display state of the pixel elements; and (ii) a measurement circuit for detecting displacement of the at least some of the first electrodes in response to external pressure applied to the viewing surface.

According to at least another example aspect, a method for using a liquid crystal display as a user input, the liquid crystal display having a plurality of first electrodes and a plurality of second electrodes located on opposite sides of a liquid crystal containing area, the first electrodes overlapping with the second electrodes defining an array of liquid crystal display pixel elements, each pixel element being associated with a unique location where an associated one of the first electrodes overlaps with an associated one of the second electrodes, at least some of the first electrodes being displaceable towards the second electrodes when pressure is applied to a viewing surface of the liquid crystal display. The method includes: (a) selectively driving the first and second electrodes to cause the pixel elements to display an image visible from a viewing side of the viewing surface; (b) sampling voltages between the first and second electrodes; and (c) determining based on the sampled voltages if any of the first electrodes have been displaced towards the second electrodes.

Further features of the invention will be described or will become apparent in the course of the following detailed description.

BRIEF DESCRIPTION OF THE DRAWINGS

In order that the invention may be more clearly understood, one or more example embodiments thereof will now be described in detail by way of example, with reference to the accompanying drawings, in which.

DETAILED DESCRIPTION

Figure 1:
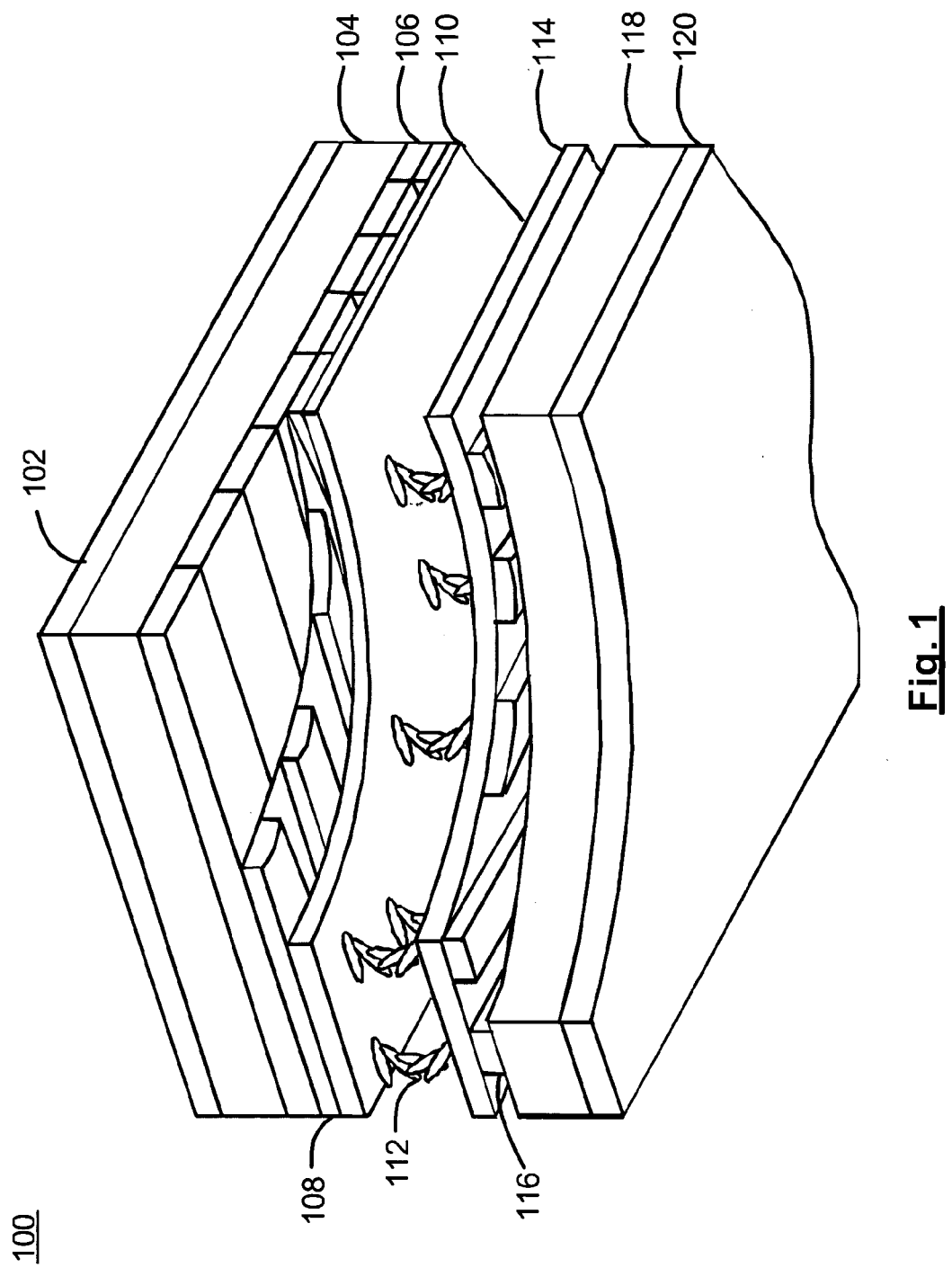
FIG. 1 is a sectional drawing showing the structure of an LCD.

Turning now to the drawings, FIG. 1 depicts an LCD structure. As it is known in the art, the LCD 100 consists of a sandwich of liquid crystal 112 between a top glass substrate 104 and a bottom glass substrate 118 with polarizers 102, 120 on the external surfaces of the glass substrates 104, 118. A user would view information on the LCD 100 through the top glass substrate 104. The polarizers 102, 120 control the light that enters and leaves the LCD 100. The top polarizer 102 is polarized oppositely or perpendicularly to the bottom polarizer 120. Polarized light enters the LCD and twists around the liquid crystal molecules 112 so that the light's polarization becomes oppositely polarized and then exits the LCD 100. Wherever light passes through all the layers of the LCD 100, pixels appear white.

On the internal surface of the top glass substrate 104 is a colour filter 106. A first layer of strips of transparent electrodes 108 is on the top glass substrate 104. A second layer of transparent electrodes 116 is attached on the internal surface of the bottom glass substrate 118, perpendicular to the first layer of electrodes 108. Therefore if the first layer of electrodes ran in a direction parallel to the width (commons) of the glass substrates 104, 118, then the second layer of electrodes 116 runs in a direction parallel to the length (segments) of the glass substrates 104, 118. These transparent electrodes are usually made using Indium-Tin Oxide (ITO). Wherever a strip of ITO from the first layer of electrodes 108 crosses a second strip of ITO from the second layer of electrodes 116, a pixel element is formed. Each strip of ITO from the first and second layer of electrodes 108, 116 is typically electrically connected to a drive circuit. At each pixel, the drive circuit can control the voltage, which determines the state of the liquid crystal material 112.

Over the electrodes are two alignment layers 110, 114, which is usually a thin polymer film that is rubbed to form grooves (grooves not shown). The grooves in the top alignment layer 110 and bottom alignment layer 114 are usually brushed or rubbed so that the liquid crystal 112 will twist in order to align with the grooves. The angles at which the alignment layers 110, 114 are brushed to form the twist in the alignment of liquid crystal molecules are typically set depending on the desired contrast, viewing angle, background colour and any other factor that determines such angles. When the electrodes are driven, a voltage is placed across the liquid crystal 112 twisting the molecules out of alignment. The light that enters the LCD 100 does not twist and subsequently cannot exit the LCD 100. Such pixels appear black.

The electrical model of a pixel is similar to a capacitor. The intersection of segments and commons of ITO 108, 116 form capacitor plates and the liquid crystal 112 acts as the dielectric of a capacitor. The capacitance is determined as follows:

$$C = (k \epsilon_O A)/d \quad (1)$$

where C is the capacitance, k is the dielectric constant, $\epsilon_O$ is the permittivity of free space, A is the area of the plates, and d is the distance between the plates. The dielectric constant of the liquid crystal 112 is determined by the type of liquid crystal 112 used in the LCD 100. In the pixel model, the area of the plates is equal to the area of the pixel, and the distance between the plates is the distance between the electrodes 108,116. Voltage V across this capacitor is equal to charge Q over capacitance C (V=Q/C), therefore, voltage is proportional to the distance between the plates.

When a force is applied to the surface of the top glass substrate 104, such as a press with a finger or stylus, the distance between the top and bottom glass substrates 104, 118 changes and thus changes the distance between the strips of ITO electrodes 108, 116. When the distance between the electrodes changes, the capacitance of the pixel changes and the change in capacitance can be detected by the resulting change in voltage at that pixel. Because of the relationship between voltage and distance between the plates, as the electrodes get closer, the pixel voltage will decrease. Using the capacitance change of an LCD pixel to determine the location of an applied force eliminates the need for touchscreen overlays, which add thickness to an LCD module and therefore add thickness to a device which houses such an LCD module. Because overlays also tend to obscure the reflection and clarity of an LCD, eliminating the overlay and using the existing LCD structure improves the visibility for a touchscreen type LCD module. Cost is also reduced since no extra material other than the LCD is required. The solution does not require an extra glass layer, or flex connectors that add to the overall cost of an LCD module.

Figure 2:
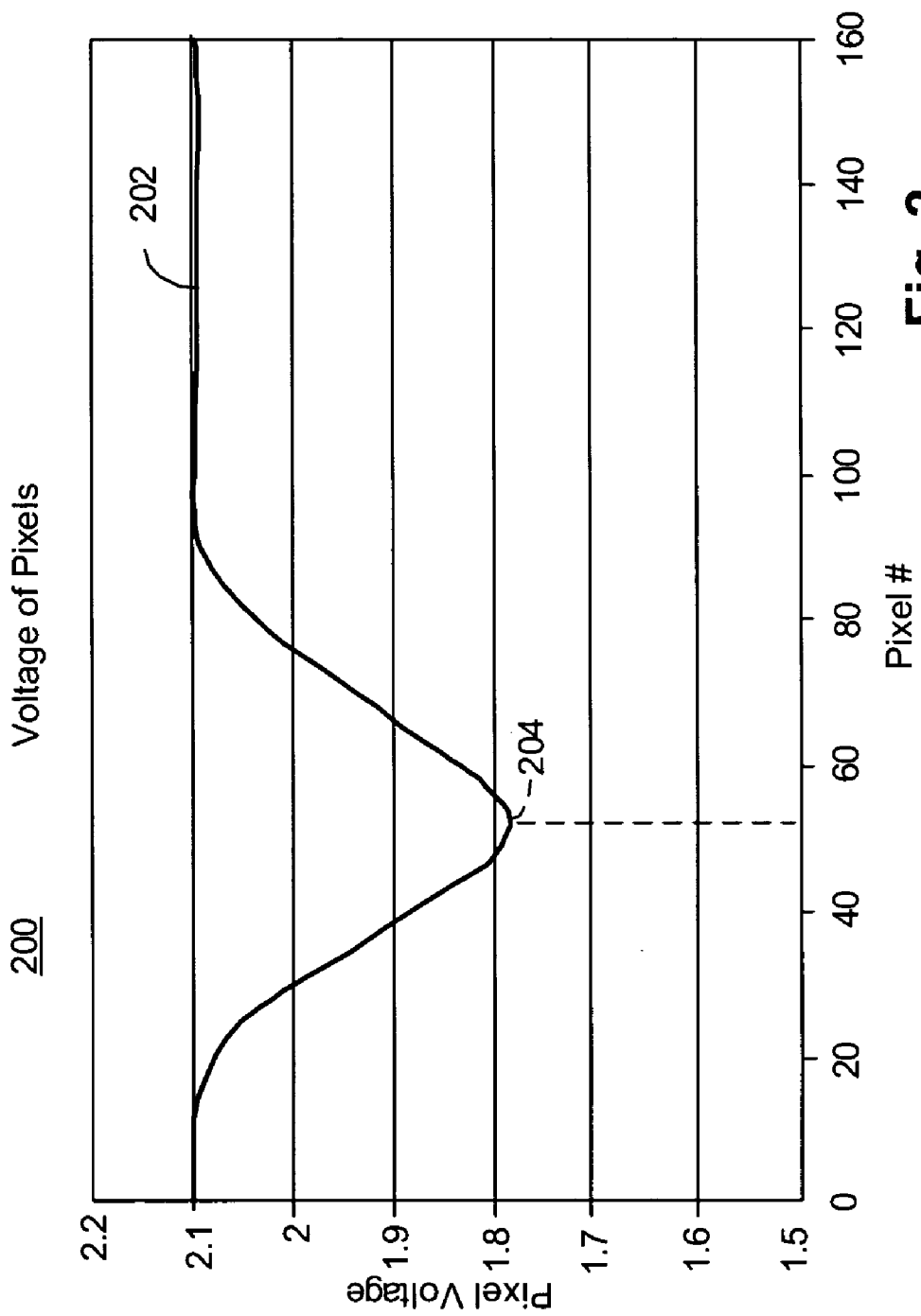
FIG. 2 is a graph depicting the voltage change for a segment of pixels due to an applied force on an LCD.

FIG. 2 is a graph depicting the voltage change for a segment of pixels due to an example of a simulated applied force on an LCD. In this example graph 200, the voltage change 202 across a segment of pixels corresponding to a strip of ITO in a 160×160 pixel LCD is indicated. The segment of pixels was numbered from 0 to 159 across an active area of the LCD. The simulated force on the top glass of the LCD was pressed at pixel 52 on this segment. The voltage change shows a drop 204 in pixel voltage at pixel 52. If the voltage at each pixel is compared to a reference voltage, then the location of the applied force can be identified by detecting the pixel location of the minimum voltage (maximum voltage difference). This reference voltage may come from a segment of pixels that is not exposed to an external pressure such as a finger or stylus press. As shown in the graph 200, the voltage drops for several pixels in the vicinity of where the LCD was pressed. These residual voltage drops are due to several factors including but not limited to the size of the finger or stylus, the pixel size, and the deflection of the glass as it is being pressed.

Figure 3:
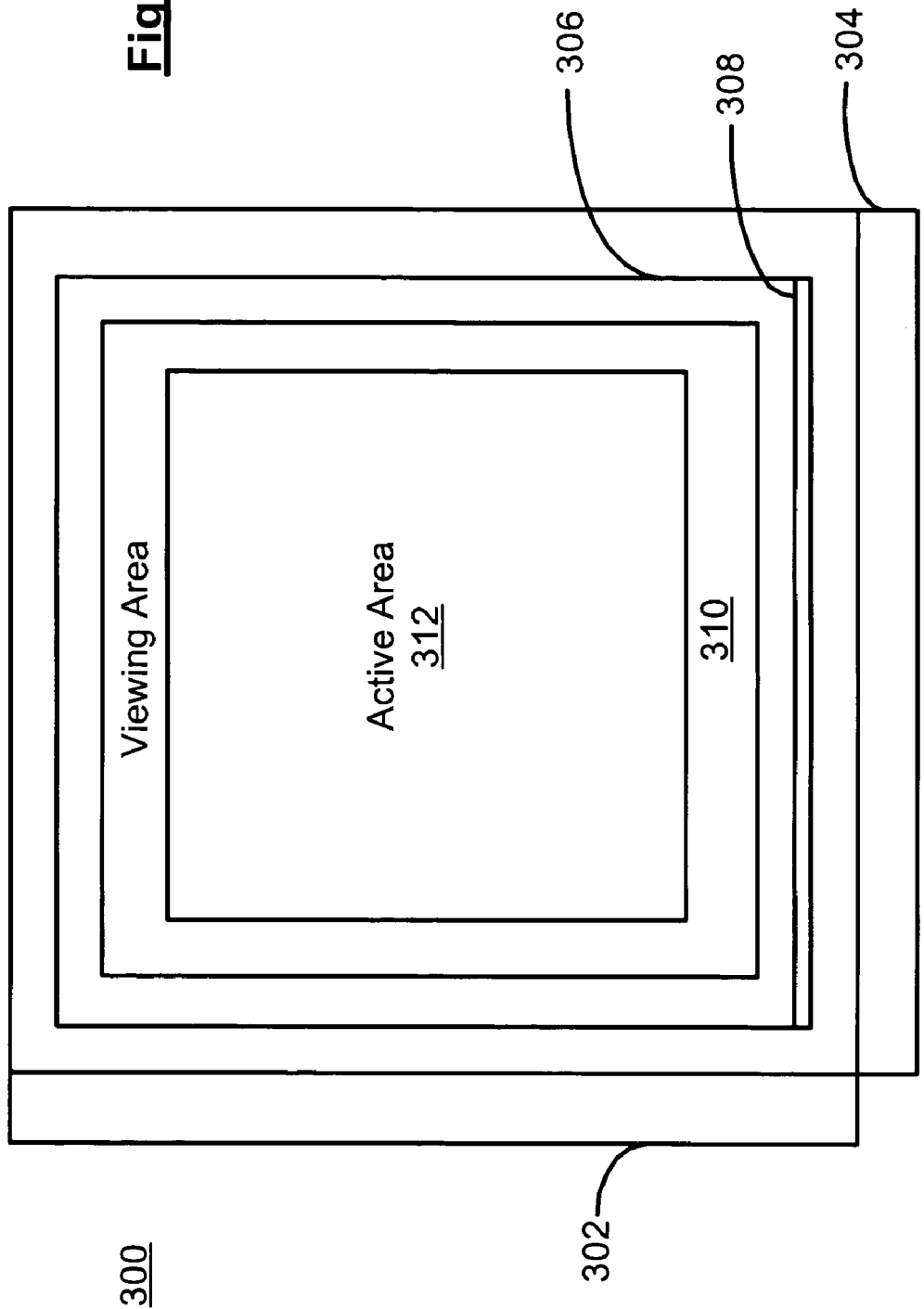
FIG. 3 is a front view of the LCD.

FIG. 3 shows a front view of an integrated touchscreen LCD assembly. The LCD assembly 300 comprises a top glass 302, and a bottom glass 304. A seal 306 encloses the liquid crystal material between the two glass substrates 302, 304. The seal 306 is preferably a glass epoxy seal. A viewing area 310 is the area of an LCD within the seal 306 that is visible through a bezel or cutout in a device in which the LCD is housed. An active area 312 is defined by a conductive area of ITO segments and commons (not shown) within the viewing area 310; that is, the area where the images are displayed. A reference ITO segment 308 is located outside the active area 312, outside the viewing area 310, in close proximity to the seal 306. In this example the reference ITO 308 is a segment, but the reference ITO 308 is not limited to a segment format, and could also be in a common format. When a force is applied to the active area 312 of the LCD 300, the reference segment 308 is not impacted because of its close proximity to the seal 306 and therefore a voltage drop across the reference segment 308 is negligible. The reference segment 308 is driven using the same data as any segment line that is being measured.

Figure 4:
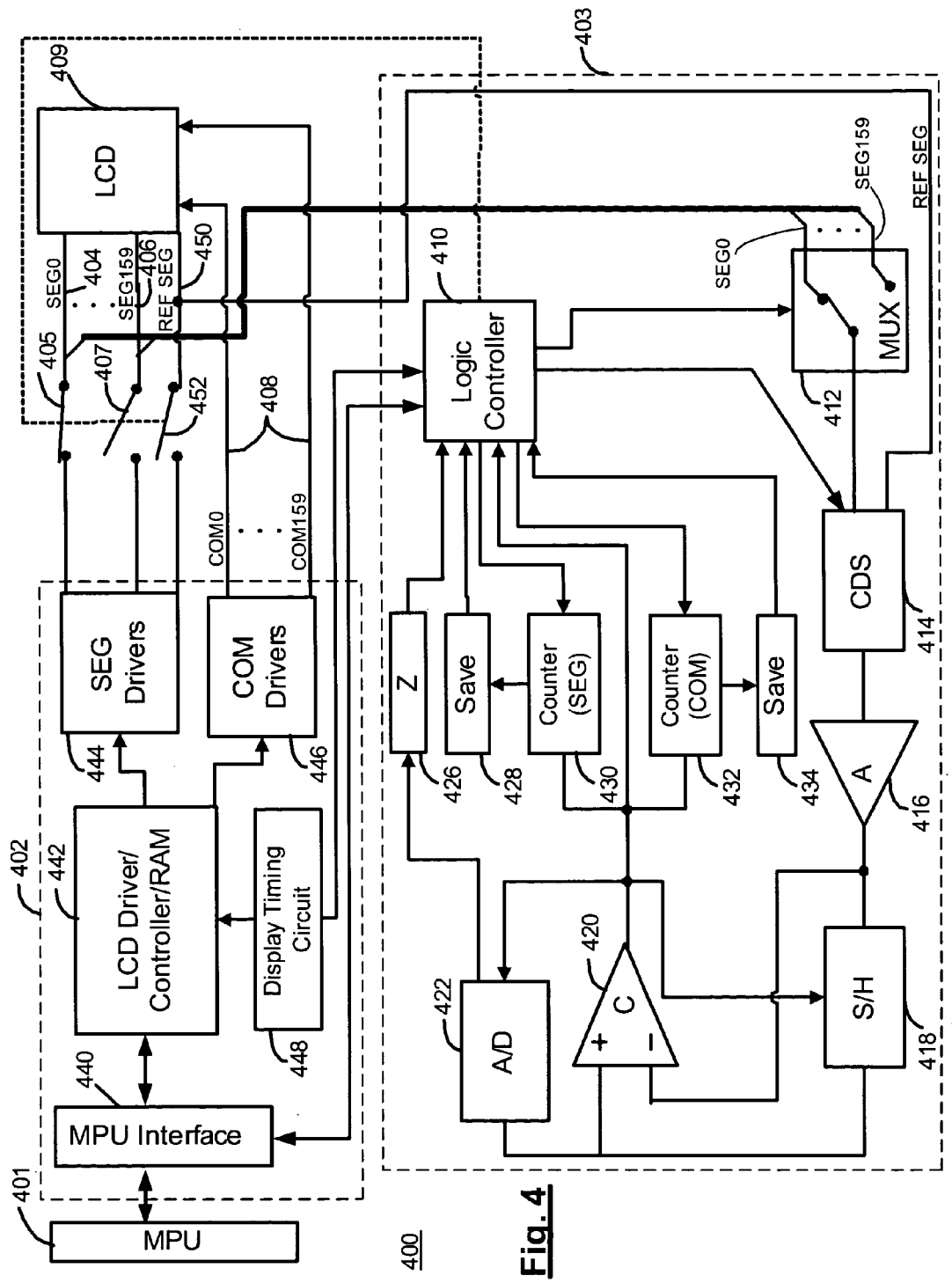
FIG. 4 is a system diagram showing touchscreen circuitry for an integrated LCD touchscreen.

FIG. 4 is a system diagram showing touchscreen circuitry for an integrated LCD touchscreen. The system is controlled by an MPU (micro-processing unit) 401. The circuit 400 comprises measuring circuitry 403 and existing LCD driver circuitry 402, which is preferably incorporated into an integrated circuit (IC). The components of the measuring circuitry 403 are preferably added to the IC housing the LCD driver circuitry 402.

The existing LCD driver circuitry 402 electrically connects to the segments 404 and commons 408 of an LCD 409, wherein the segment lines 404 have switches 405 to disconnect the pixels of the segment from the driver 402. These switches 405 are controlled by a logic controller 410. In this example, one segment 406 is disconnected from the drive circuitry 402 at any given time by opening the segment switch 407. The LCD 409, in this example, has 160×160 pixels; therefore there are 160 segment lines (SEG0–SEG159) 404 and 160 common lines (COM0–COM159) 408. A reference segment line (REF SEG) 450 is also controlled by the driver circuitry 402 wherein the REF SEG also has a switch 452 controlled by the logic controller 410. The system also preferably comprises a multiplexer (MUX) 412, a correlated double sampler (CDS) 414, an amplifier 416, a sample and hold (S/H) 418, a comparator (C) 420, an analog-to-digital converter (A/D) 422, and several registers 426, 428, 430, 432, 434.

The MPU 401 communicates with the driver circuitry 402. The driver circuitry preferably comprises an MPU interface 440, an LCD controller with RAM 442, SEG drivers 444, COM drivers 446, and a display timing circuit 448. The MPU 401 communicates with the driver circuitry via the MPU interface 440, which converts the MPU data into LCD driver data. The LCD controller 442 takes the data from the MPU 401 and combines it with data from the display timing circuit 448. The display timing circuit 448 defines the frame frequency of the LCD and determines when the segments and commons are driven. The LCD controller converts the combination of data from the MPU 401 and the display timing circuit 448 to driver data and sends it to the SEG drivers 444 and the COM drivers 446, which respectively drive the SEG lines 404 and the COM lines 408. The SEG lines and COM lines form the pixels on the LCD 409. The LCD controller uses RAM as a frame buffer for representing data that is to be displayed.

The switch 407 on a scanned segment line 406 disconnects the pixels on that segment line from the SEG driver 444. The voltage of the disconnected segment line may be measured by the measuring circuitry 403. The logic control 410 determines when the switches 405, 407 are opened or closed and only one switch will be opened at a time. A switch 407 is open preferably for approximately one frame, which is when an entire LCD screen is updated or refreshed. A typical frame frequency for a 160×160 LCD is 65 Hz. The SEG driver 444 drives the REF SEG 450 with the same data as the segment that is being sampled.

The logic controller 410 performs several functions in this system 400. As previously mentioned, the logic controller 410 opens a segment switch 407 for measurement by the measuring circuitry 403. The logic controller 410 also addresses the MUX 412 to select a sample segment (in this example, segment 159 406 is sampled and scanned) for scanning such that it is disconnected from the SEG driver 444 by opening the sample segment switch (407). The logic controller 410 provides the clock signal to the CDS 414 to define when the sampling occurs. The CDS 414 subtracts the reference segment voltage from the voltage of the sample segment line 406. Using a CDS 414 is a technique commonly used in the field of CCD (charged coupled device) imaging to process the output signal from a CCD image sensor in order to reduce low-frequency noise from components such as the LCD driver circuit, components within the device housing the LCD, and sources outside the device. Using CDS in CCD imaging is well known in the art.

The CDS 414 sends the voltage difference to the amplifier 416, which increases the signal since the voltage difference from the CDS 414 will be very small. The amplified signal is sent to the S/H 418. The S/H 418 stores the maximum voltage difference measured for all the scanned segments. The comparator 420 compares the present voltage difference with the maximum voltage difference stored in the S/H 418. If the present voltage difference is greater than that stored in the S/H 418, then the comparator output is asserted and a new maximum voltage difference is stored by the S/H 418. If the present voltage difference is not greater than the stored voltage difference in the S/H 418, then no new voltage difference is stored. The logic controller 410 then scans the next segment until all segments are scanned.

There are two scanning directions being measured in this example. When the sample segment 406 is scanned by the logic controller 410, the measuring circuit 403 sees 160 different output readings for this sample segment 406 as the common lines 408 are driven one by one. The logic controller 410 then determines the sample segment 406 that has the maximum difference from reference segment 450. When the logic controller 410 starts scanning segments the location of the force can also be determined along the common lines 408. The SEG counter register 430 and COM counter register 432 keep track of which segment and common are being measured, respectively. The logic controller 410 saves the value in the SEG counter 430 and COM counter 432 when the comparator 420 triggers the logic controller 410 the counter value for both SEG and COM are saved. These saved values represent the location of the maximum voltage difference.

If the present voltage difference is higher than the stored voltage difference, the A/D 422 converts the voltage difference to a value that represents the force applied to the glass and may save it to a register, Z, 426. This value may be used for input options. Detecting the amount pressure used in the applied force can indicate what kind of press was used; for example determining the amount of force applied can indicate if the user had made a full press or a double press. As the force applied to the glass increases, the capacitance at the selected pixels increases and subsequently the voltage difference increase. When the voltage at the selected pixels is compared to the REF SEG 450, the difference will be larger than a segment that has no applied force.

In an idle mode, where there is no force applied to the LCD glass, the measuring circuit 403 preferably scans only one segment at a slow rate. A slow rate is selected to reduce power consumption that scanning may increase. Another reason for a slow rate of scanning is to reduce the impact on the contrast of the LCD. This segment is preferably located in the middle of the LCD 408. Therefore, if a 160×160 LCD is used, the middle segment is segment 79

In an alternative embodiment, the measuring circuitry 403 may scan more than one segment when in idle mode. In this embodiment, the measuring circuitry may alternate the scan for an applied force on the LCD glass by scanning one segment per frame in selected areas of the LCD 408. For example, if the measuring circuitry scans three segments in the idle mode, the measuring circuitry may scan a segment near one edge of the active area 312 of the LCD in one frame, a segment at the middle of the active area 312 in the next frame, and a segment at the opposite edge of the active area 312 in the next frame.

When a new maximum voltage difference is measured and saved and the comparator 420 triggers the logic controller 410 from idle mode into scan mode, the logic controller 410 scans the segments of the LCD and compares each segment to the REF SEG 450. To minimize power consumption and contrast degradation, a percentage of the segments are preferably scanned. For a 160×160 LCD, the minimum percentage of segments scanned to minimize power consumption and contrast degradation is approximately 10%. In an alternative embodiment, for higher accuracy of determining the location of an applied force, a higher percentage of segments or all the segments are scanned when the logic controller is triggered into the scan mode.

In a further alternative embodiment, if more than one segment is scanned in idle mode, then when a force is applied to the LCD glass, the segment that is continuously scanned closest to the force has the maximum voltage difference measurement. The measuring circuit may only scan the segments in close proximity to the scanned segment with the lowest voltage difference measurement.

When a force is applied to the LCD glass, the logic controller sends an interrupt signal to the MPU interface 440, which in turn sends the signal to the MPU 401. The MPU reads the location value of the applied force and interprets the corresponding input made by the user. The location registers are cleared.

In an alternative embodiment, the center of deflection of an applied force may be calculated by the device operating system by taking a weighted averaged of all deflections and calculating the centroid of the force. Such a calculation is made to determine the location of an applied force with greater accuracy. In the mode previously described, a location of an applied force can be defined by which segment and common have the lowest voltage. Using a centroid calculation allows the location to be determined to a fraction of a pixel. This method is preferred for applications that require high resolution such as hand writing recognition. The centroid calculations are determined using the following formulae:

$$Seg_{centroid} = X_o + \frac{\sum_{com=0}^{com} \sum_{seg=0}^{seg} SEG\_counter \times Z(seg, com)}{\sum_{com=0}^{com} \sum_{seg=0}^{seg} Z(seg, com)} \quad (2)$$

$$Com_{centroid} = Y_o + \frac{\sum_{seg=0}^{seg} \sum_{com=0}^{com} COM\_counter \times Z(seg, com)}{\sum_{com=0}^{com} \sum_{seg=0}^{seg} Z(seg, com)} \quad (3)$$

The location of the applied force is found as previously described. The pixels around the location of the lowest recorded voltage are scanned again, for example in a 10×10 matrix around the location. A 10×10 matrix is an example of the size of a typical finger press; however, the matrix is not limited to such a matrix size. Smaller matrix sizes may be used to represent a typical force applied from a stylus press.

In equation (2), $X_0$ is the segment number for the starting location of the matrix. Typically, this segment is the leftmost segment of the matrix, but may also be the rightmost segment. SEG counter is the value in the SEG counter register 430. Z(seg, com) is the value representing the amount pressure of the applied force, which is stored in the Z register 426.

In equation (3), $Y_0$ is the common number for the starting location of the matrix. Typically, this common is the topmost segment of the matrix, but may also be the bottom most segment. COM counter is the value in the COM counter register 432. Z(seg, com) is the value representing the amount pressure of the applied force, which is stored in the Z register 426.

The centroid calculation is analogous to a center-of-mass calculation for an object if the local mass density is represented, in this case, as the pressure of an applied force.

Figure 5:
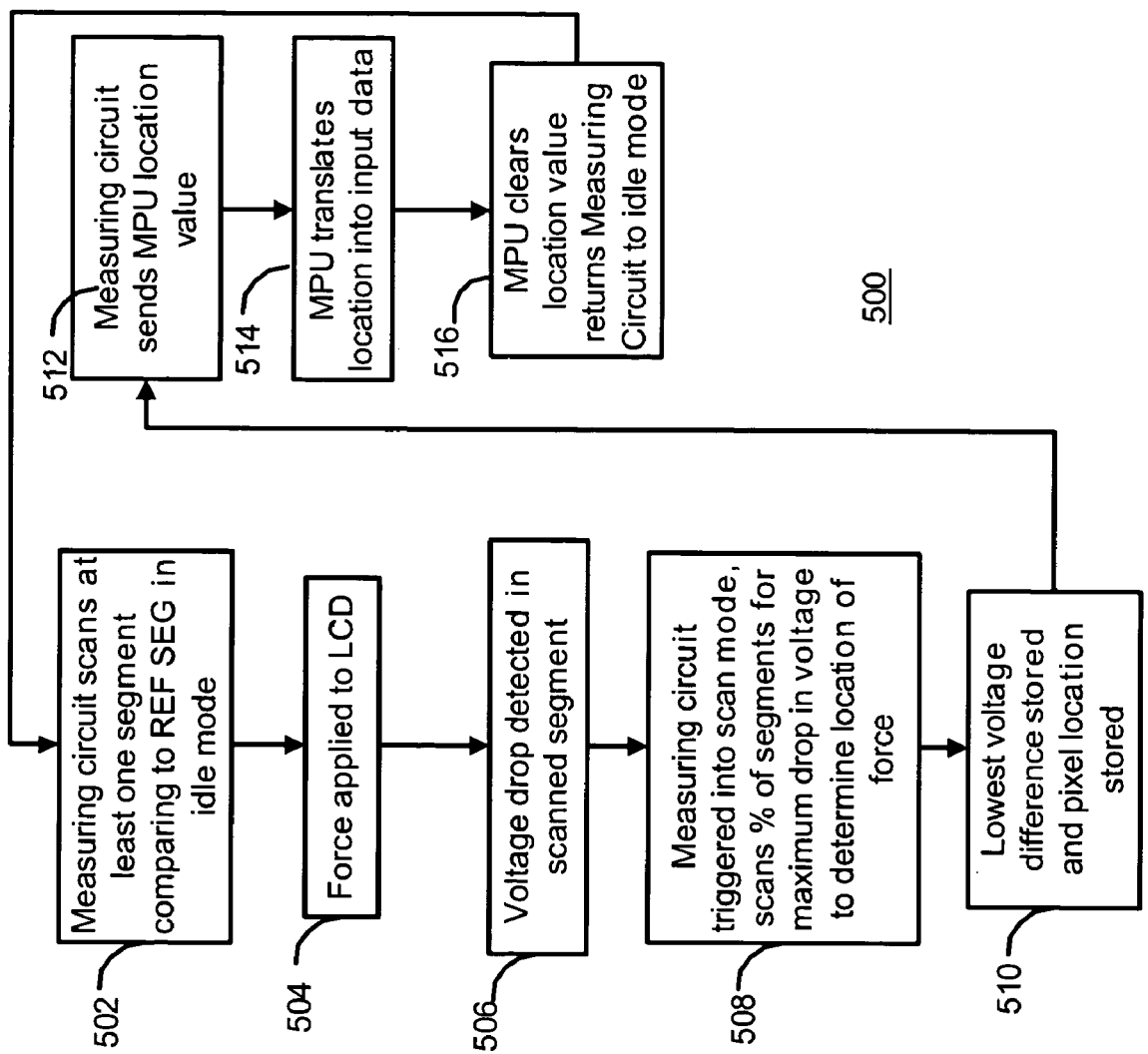
FIG. 5 is a flow diagram showing the method for sensing a force applied to the LCD.

FIG. 5 is a flow diagram illustrating the method 500 used to determine the location of an applied force to an LCD. In step 502, the measuring circuit 403 is in idle mode and scans at least one segment in the active area of an LCD. The measuring circuit 403 compares the voltage of the scanned segment 406 to the reference segment 450. In step 504, a user applies a force to the LCD glass to make an input to a device housing the LCD. In step 506, a voltage drop is detected across the scanned segment 406. The measuring circuit 403 is triggered into scan mode in step 508. The measuring circuit 403 scans a percentage of the segments to find the segment with the maximum drop in voltage. The percentage is preferably between 10% and 100% of segments. The maximum drop in voltage represents the location of the applied force. In step 510, the maximum voltage difference between a scanned segment and the reference segment 450 is stored. The segment and common locations of the maximum voltage difference is also stored. In step 512, the measuring circuit 403 sends the MPU 401 the location value. In step 514, the MPU 401 translates the location into input data. In step 516, the MPU 401 clears the location value and returns the measuring circuit 403 to the idle mode. The method 500 returns to step 502 where the measuring circuit continuously scans at least one segment.

The presently described invention can be applied to display panels of both passive matrix and active matrix type displays. In active matrix type displays the control and measurement circuitry can be conveniently incorporated as part of the display panel.

It will be appreciated that the above description relates to the preferred embodiment by way of example only. Many variations on the invention will be obvious to those knowledgeable in the field, and such obvious variations are within the scope of the invention as described and claimed, whether or not expressly described.

We claim:

1. A touchscreen liquid crystal display comprising: a liquid crystal display including a viewing surface, a liquid crystal area containing liquid crystal located behind the viewing surface, a plurality of spaced apart elongate first electrodes located on a viewing surface side of the liquid crystal area and a plurality of spaced apart elongate second electrodes located on an opposite side of the liquid crystal area, the first and second electrodes overlapping to form an array of liquid crystal pixel elements, at least some of the first electrodes being displaceable towards the second electrodes in response to external pressure applied to the viewing surface; and a control circuit connected to the first and second electrodes for controlling the operation of the liquid crystal display and including: (i) a driver circuit for driving the electrodes for selectively controlling a display state of the pixel elements; and (ii) a measurement circuit for measuring voltages across at least some of the pixel elements and detecting displacement of the at least some of the first electrodes in response to external pressure applied to the viewing surface based on the measured voltages; and a reference electrode in the liquid crystal display overlapping with the first or second electrodes to form reference pixel elements, the measurement circuit comprising a comparison circuit for comparing the measured voltages to reference voltages measured from the reference pixel elements, wherein the reference pixel elements are located outside of a viewable area of the liquid crystal display a sufficient distance so as not to be substantially affected by external pressure applied to the viewing surface.

2. The display of claim 1 wherein the measurement circuit is configured for determining a location of the external pressure on the viewing surface based on the measured voltages.

3. The display of claim 2 wherein the measurement circuit is configured for determining a relative force of the external pressure on the viewing surface based on the measured voltages.

4. The display of claim 1 wherein the control circuit is configured for operating in a first mode and in a second mode, wherein in the first mode the measurement circuit measures voltages across a subset of the pixel elements until the measured electrical characteristic indicates that external pressure has been applied to the viewing surface, after which the control circuit automatically operates in the second mode, wherein in the second mode the measurement circuit measures voltages across a larger set of the pixel elements and determines the location of the external pressure based thereon.

5. The display of claim 4 wherein a location of the external pressure is determined based on which measured pixel element voltage varies the greatest from a reference value determined in dependence on the reference voltages.

6. The display of claim 1 wherein each of the first and second electrodes is a substantially transparent strip electrode, the first electrodes being arranged substantially parallel to each other, the second electrodes being arranged substantially parallel to each other and substantially orthogonal to the first electrodes for defining the array of pixel elements, each pixel element being associated with one of the first electrodes and one of the second electrodes, the measuring circuit including a sampling circuit for sampling a voltage across each of the pixel elements and a processing circuit for detecting the displacement and a location thereof based on the sampled voltages, the reference electrode being arranged substantially parallel to either the first or second electrode and substantially orthogonal to the other of the first or second electrode.

7. The display of claim 6 wherein a plurality of scan-able electrodes are included among at least one of the first electrodes and the second electrodes, each scan-able electrode being connected by an associated switch to the driver circuit, the sampling circuit including a controller for individually controlling each switch, the controller being configured for opening the switch associated with a selected one of the scan-able electrodes and causing the voltage across the pixel elements associated with the selected one of the scan-able electrodes to be sampled when the switch associated with the selected one of the scan-able electrodes is open.

8. The display of claim 6 wherein the electrodes are Indium-Tin Oxide (ITO).

9. A method for using a liquid crystal display as a user input, the liquid crystal display having a plurality of first electrodes and a plurality of second electrodes located on opposite sides of a liquid crystal containing area, the first electrodes overlapping with the second electrodes and defining an array of liquid crystal display pixel elements, each pixel element being associated with a unique location where an associated one of the first electrodes overlaps with an associated one of the second electrodes, at least some of the first electrodes being displaceable towards the second electrodes when pressure is applied to a viewing surface of the liquid crystal display, the display having a reference electrode overlapping with the plurality of first electrodes or with the plurality of second electrodes to form reference pixel elements that are located outside of a viewable area of the liquid crystal display a sufficient distance so as not to be substantially affected by external pressure applied to the viewing surface, the method including:
(a) selectively driving the first and second electrodes to cause the pixel elements to display an image visible from a viewing side of the viewing surface;
(b) sampling voltages between the first and second electrodes;
(c) sampling voltages between the reference electrode and the plurality of first electrodes or second electrodes that the reference electrode overlaps with; and
(d) determining based on the sampled voltages if any of the first electrodes have been displaced towards the second electrodes.

10. The method of claim 9 wherein the sampling step (b) includes sampling voltages between the first and second electrodes at least some of the pixel element locations.

11. The method of claim 10 including sampling voltages at a sub-set of pixel element locations until a determination is made that a displacement of first electrodes has occurred and then sampling voltages at a larger set of pixel element locations and determining based on the sampled voltages from the larger set a relative location of the displacement.

12. The method of claim 11 wherein the sub-set of pixel element locations includes pixel element locations associated only with a single line in the array of pixel elements.

13. The method of claim 11 wherein the sub-set of pixel element locations includes a plurality of spaced apart groups of pixel element locations.

14. The method of claim 11 wherein sampling of the sub-set is carried out at a lower rate than sampling of the larger set.

15. The method of claim 11 wherein based on the measured voltages from the sub-set a general location of the displacement is determined, and the larger set is selected to include the general location.

16. The method of claim 10 including determining a relative location of the displacement and a relative magnitude of the force causing the displacement based on the measured voltages and translating the determined location and magnitude into at least one input value for an electronic device associated with the display.

17. The method of claim 10 including determining the center of deflection of the displaced first electrodes by determining, based on the measured voltages, a weighted average of the deflection at a plurality of the pixel locations and determining a centroid of the deflection based on the weighted average.

18. The display of claim 6 wherein the reference electrode forms the reference liquid crystal pixel elements with the first electrodes, and the second electrodes are each individually sampled to acquire the measured voltages, the reference electrode being driven with the same data as the second electrode being sampled.

19. A touchscreen liquid crystal display comprising:
a liquid crystal display including an array of display pixel elements formed by a plurality of parallel first electrodes located on one side of a liquid crystal containing area and overlapping with plurality of parallel second electrodes located on an opposite side of the liquid crystal containing area;
a plurality of reference pixel elements formed by a reference electrode extending parallel to the plurality of first electrodes on the one side of the liquid crystal containing area and overlapping with the plurality of second electrodes, the reference pixel elements being located outside of a viewable area of the liquid crystal display a sufficient distance so as not to be substantially affected by external pressure applied to the viewable area through a viewing surface of the liquid crystal display;
a driver circuit coupled to the electrodes for driving the electrodes for selectively controlling a display state of the display pixel elements; and
a measurement circuit coupled to the electrodes for scanning at least some of the first electrodes by: measuring display pixel element voltages for at least some of the display pixel elements formed by the first electrode being scanned, and for each display pixel element for which a display pixel element voltage is measured, measuring a corresponding reference pixel element voltage at the reference pixel element that is formed by the reference electrode overlapping with the same second electrode that forms with the first electrode being scanned the display pixel element,
the measurement circuit detecting in dependence on the measured display pixel element voltages and the corresponding reference pixel element voltages a relative displacement between at least some of the first electrodes and the second electrodes in response to external pressure applied to the viewing surface.

* * * * *